United States Patent [19]

Galli et al.

[11] Patent Number: 5,234,326
[45] Date of Patent: Aug. 10, 1993

[54] TIRE MOLD HAVING A PLURALITY OF BLOCKS DEFINING A MATRIX WITH VENTING GAPS BETWEEN THE BLOCKS

[75] Inventors: Giuseppe Galli, Milan; Renato Caretta, Gallarate, both of Italy

[73] Assignee: Pirelli Coordinamento Pneumatici S.p.A., Milan, Italy

[21] Appl. No.: 683,858

[22] Filed: Apr. 11, 1991

[30] Foreign Application Priority Data

Apr. 13, 1990 [IT] Italy ........................ 20036 A/90

[51] Int. Cl.$^5$ ............................................. B29C 39/22
[52] U.S. Cl. ................................... 425/46; 425/47; 425/812
[58] Field of Search ........................ 425/812, 46, 47

[56] References Cited

U.S. PATENT DOCUMENTS

| | | | |
|---|---|---|---|
| 2,442,718 | 6/1948 | Woock | 425/812 |
| 2,444,898 | 7/1948 | Butterfield | 425/47 |
| 2,599,433 | 6/1952 | Cohen | 425/812 |
| 2,924,851 | 2/1960 | Birckhead et al. | 425/812 |
| 3,842,150 | 10/1974 | Carter | 425/812 |
| 3,854,853 | 12/1974 | Mirtain | 425/47 |
| 4,086,047 | 4/1978 | Johnsen | 425/47 |
| 4,379,687 | 4/1983 | Wilson et al. | 425/388 |
| 4,655,699 | 4/1987 | Collier | 425/46 |
| 4,691,431 | 9/1987 | Hayata | 249/135 |
| 4,708,609 | 11/1987 | Yoda et al. | 425/28 D |
| 4,812,281 | 3/1989 | Beard et al. | 264/502 |
| 4,895,502 | 1/1990 | Beard et al. | 425/29 |
| 4,909,972 | 3/1990 | Britz | 425/812 |
| 5,066,209 | 11/1991 | Schraderer et al. | 425/47 |

FOREIGN PATENT DOCUMENTS 0384775 8/1990 European Pat. Off. .
1933816 1/1971 Fed. Rep. of Germany .
2210099 9/1973 Fed. Rep. of Germany .
51-119776 10/1976 Japan .
61-108512 5/1986 Japan .

OTHER PUBLICATIONS

Hayata is cited as of interest for disclosing aluminum as a mold material and various radial and circumferential vent grooves or clearances (see FIGS. 4 and 8).

Carter is cited as of interest for disclosing plural circumferential vents (grooves) a vacuum system and interconnecting passages between the circumferential vent grooves.

Primary Examiner—Jay H. Woo
Assistant Examiner—Robert B. Davis
Attorney, Agent, or Firm—Stevens, Davis, Miller & Mosher

[57] ABSTRACT

In a metallic mold, all or a part of the annular portion for molding at least the tread of the tire is formed by a plurality of small separate pieces that can be combined to form said annular portion. Between these small pieces, during the molding of the tire, clearances are maintained so as to permit the passage of air but not the passage of rubber. The above clearances are connected through vent holes to air suction means. Such vent holes are also connected with means for blowing pressure fluid through the clearances. The construction of this mold portion by means of small pieces made with cuts of the aforementioned portion in the axial and the circumferential direction permits regulation of the width of the clearances with respect to the rheometric characteristics of the elastomeric material to be molded and to adapt easily the mold to different tire sizes by increasing or decreasing the number of such pieces.

18 Claims, 5 Drawing Sheets

TIRE MOLD HAVING A PLURALITY OF BLOCKS DEFINING A MATRIX WITH VENTING GAPS BETWEEN THE BLOCKS

BACKGROUND OF THE INVENTION

The present invention concerns the manufacturing of molds, generally metallic, for curing and molding tire raw carcasses. A mold for tire molding includes different types of protrusions on its surface, so that pressing a raw tire against the surface of the mold in the tread band of the tire a protruding design is obtained. However when a raw tire is pressed against the surface of the mold, there is air between the surface of the mold and the tire and thus, since the design is formed with protrusions from the surface of the mold, the air contained between mold and tire has no way to escape and remains thus trapped. Consequently on the surface of the cured tire depressions appear as small hollows, technically known as a "shortage" but hereinafter simply called "bubbles" that reduce the commercial value of the tire.

To eliminate such air hollows (bubbles) the thoroughgoing holing or microfissures methods are usually used or a combination between them, according to which the metallic mold is provided with very small holes or thin fissures, piercing radially the body of the mold or the transverse holes or slots method according to which in the protrusion bodies holes or thin slots are made that cross right through the protrusion body. However, when using thoroughgoing holes or similar contrivances, a finishing operation is necessary because also the rubber enters these openings producing rubber protrusions (burrs) on the surface of the tire and so it is also necessary to use a further separate device to eliminate the said burrs. However, even after the burrs have been removed, their trail remains and the product is still adversely affected. In the case of the holes or of transverse slots in the protrusions or similar contrivances, there is the disadvantage that it is difficult to remove completely the air hollows between the protrusions. Also in the grooves of the tread, rubber protrusions are formed constituted by the burrs, that compromise the desirability of the tire.

PRIOR ART

In addition to above described methods, according to prior art (e.g., Japanese published Patent Application No. 61-108512 (1986l) a system is further known according to which are assembled, in axial direction, thin center holed disks, produced with a computerized design and drawing systems, grooves being obtained on the reciprocal contact surfaces of the disks suitable to serve as air vent holes: this system would not need to have thoroughgoing holes and would facilitate a partial modification of the tread. However, after assembling, the grooves used as air vent holes perform as the usual thoroughgoing holes and thus on the surface of the tire burrs are formed.

Another suggested method in the prior art, to prevent burr formation, is disclosed in Japanese Published Patent No. 51-119776 (1976), according to which sectorial mold elements are assembled together to form a mold.

According to this known method, because the coupling surfaces of the sectorial elements have a roughness of the same size order of surfaces worked in the usual way, between these surfaces reciprocal contact microclearances remain. For the presence of these clearances, air can escape while the rubber could not flow inside the microclearances, since they are extremely thin, and thus bubbles and burrs would not be produced on the surface of the tire.

However in these known prior art methods, that comprise in the sectorial mold elements assembling, the respective sectorial elements are those formed by cutting a metallic annular mold in an axial direction, therefore causing the disadvantage that the method cannot be applied to a great variety of protrusion patterns on the tire tread. More particularly, in the case for example of a metallic mold having a complicated pattern on its surface, if the mold is cut by a plurality of cutting lines extending in the circumferential direction, then it is possible that a block of the pattern is subdivided in two parts, one of which is extremely thin, but such a construction involves problems from the viewpoint of its mechanical strength. Besides, when it is desired to obtain on the tread of the tire a groove that is extremely thin, the method is used to insert in the body of the mold a thin metallic lamel about half of which protrudes externally: in this case, should the cutting line pass through the lamel, there is the possibility that the thin lamel be deviated in correspondence with the junction borders.

There are difficulties also as regards mechanical operation.

SUMMARY OF THE INVENTION

The present invention has been developed in view of the above prior art disadvantages, so that the scope of the invention is to provide a mold for molding tires in which the molding matrix can adapt to a great variety of tread patterns and is capable of producing a tire having no burrs or bubbles. This objective is reached with a mold in which at least part of its annular portion for tread molding is composed of a plurality of small separate pieces, and these blocks are worked in such a way that they can be assembled to form the mold matrix, maintaining between them an appropriate clearance.

In its first aspect the present invention concerns a mold for the curing of raw carcasses of tires for vehicles. The mold is of the centripetal type, comprising two lateral axially opposite portions, substantially corresponding to the sidewalls of said tire, axially and reciprocally displaceable with respect to the other, and an annular central portion, interposed between said lateral portions, substantially corresponding to the portion of the tire on which is formed a tread pattern. The annular portion is made with a plurality of sectors circumferentially disposed around the axis of said mold, radially displaceable both inwardly and outwardly perpendicularly to said axis, said sectors being provided on their radially internal surface with a protruding rib matrix to form the corresponding tread pattern portion, said mold being characterized in that said matrix is composed by a plurality of blocks, disposed in at least two circumferential flanked rows, separate one from another and from the body of the sector that contains them, by clearances of established width. The width of the clearances is determined according to the rheometric characteristics of the mix and molding conditions, such not to cause burrs on the surface of the cured tire. More exactly, the width of said clearance is chosen according to the curing conditions (pressure and temperature of the fluid) and to the rheometric characteristics of the rubber, specifically of the tread.

Conveniently, the width of said clearance is chosen in such a way to allow at least 2000 moldings before there is a need for cycle end cleaning of the mold.

Preferably the value of this width is not more than 0.08 mm, measured at the working temperature of said mold. As these clearances between the blocks are throughgoing, during the forming and curing operations the formation of the known hollows (bubbles) originated by the trapped air, can be avoided by air evacuation, while simultaneously, because of their appropriate size, the elastomeric material is prevented from entering said clearances, therefore also preventing formation of burrs. Preferably the said blocks are disposed in at least three circumferential rows, at least fifty for each row, not necessarily the same number for all the rows. Since the matrix of the mold is subdivided in said number of blocks, it is evident that liberty in the placement of the blocks is augmented as compared to the known disks or annular elements, and for this it is possible to build a mold suitable for a large tread pattern variety, solid and of long life.

According to a second feature of the present invention, there is provided a mold in which at least part of the are mentioned annular portion comprises a plurality of blocks mounted in such a way to be displaceable in the axial and circumferential directions with respect to the support sector, to form the matrix. Preferably in fact, the above blocks are provided, on the surface directed toward the support sector, with a projection conveniently developed in the circumferential direction, housed in a circumferential groove formed in the body of said sector, so that said blocks are circumferentially displaceable with respect to said sector. Between the projections and the corresponding groove that contains them, there exists a clearance to permit a displacement in the axial sense and a slippage in the circumferential sense of the block with respect to the support sector.

As the blocks are supported to be movable axially and circumferentially, if the clearances between the adjacent blocks are correctly calculated taking in consideration their thermal expansion, it is sufficient, during the assembling, to dispose the blocks, sidewall against sidewall and to assign any remaining space as the sum of the respective clearances and thus the regulation of the clearances becomes simple.

Alternately the desired width of the above clearances may be obtained with a convenient profile, not complementary, of the surfaces at reciprocal contact, or obtaining opportune projections on the reciprocally opposed surfaces of the blocks or interposing adapting spacers between said surfaces.

In addition, generally a tread pattern has a linear succession of elementary portions (pitches) which are similar between them but of different circumferential length (pitch variation) to prevent generation of noise; accordingly, in the mold of the invention each block corresponds to a different pitch or pitch fraction of the relative tread pattern so that a shift of the pitch sequence of the tread pattern can be easily carried out by changing the sequence in the succession of the blocks, without necessity to make another mold.

Furthermore, because a change in the adjoining relationship and the elimination of the blocks can be easily accomplished, it becomes extremely simple and cheap to change the arrangement of the matrix in both the axial and circumferential direction.

According to a third feature of the present invention, a mold for tire molding is provided in which, to at least some of the reciprocal separation surfaces between said blocks, air vent holes are provided which communicate with the clearances between the above blocks, formed in the body of the corresponding sectors, on the surface facing the blocks. Conveniently said vent holes can be alternately connected with aspiration fluid means and with fluid pressure means.

When said aspiration means are activated, during the curing and molding cycle, the residual air in the mold can be forcedly extracted due to the clearances and evacuated through these vent holes and so bubble formation is prevented. Vice versa, should rubber material obstruct the clearances between the blocks, for the fact that the fluid pressure means can blow fluid in the clearances through such vent holes, the occluding material may be removed so that the clearances can be maintained cleaned and so the clearances are able to function to prevent bubble formation.

A further aspect the invention regards a mold for the curing of raw carcasses of tires, the mold being of the type having two half pieces )shell type mold), comprising two symmetrical axially opposite parts, axially reciprocally displaceable, substantially concave on the opposed surfaces, the concave surface of each part presenting a radially inner central portion, substantially corresponding to a sidewall of the tire, and an annular radial external portion, substantially corresponding to a half of the tread of said tire, characterized in that at least part of the annular portion is formed by a plurality of blocks disposed in at least two circumferential rows, said blocks being separate reciprocally between them and from said radially more internal portion with clearances of established width, according to the rheometric characteristics of the mix and to the molding conditions such as not to cause burrs on the surface of the cured tire.

Further, in its more general aspect, the invention regards a mold for curing of hollow articles in elastomeric or plastomeric materials, comprising two axially opposite lateral portions and an interposed annular central portion, characterized in that at least part of said annular portion comprises a plurality of blocks disposed in at least two circumferential axially flanked rows, said blocks being reciprocally separated between them, both in the circumferential and in the axial direction, by clearances of pre-established width, according to the rheometric characteristics of the mix and to the molding conditions such as not to cause burrs on the surface of the cured tire.

The value of such width is preferably not more than 0.08 mm, measured at the operating temperature of said mold.

In another of its aspects the invention further concerns a method of manufacturing curing molds for tires comprising two axially opposite lateral portions, substantially corresponding to the sidewalls of the tire and an interposed annular central portion, substantially corresponding to the tread of the tire, in which at least said annular portion includes a matrix provided with protrusions, said matrix being formed separate from the corresponding supporting mold portion and successively mounted on said supporting portion, said method being characterized in that it includes the following steps:

forming a plurality of shaped blocks able to be assembled together to form said matrix, said blocks being provided, on the surface toward said support portion, of an oriented circumferential protrusion, forming in the body of said support portion, on the surface directed to said blocks, grooves able to house said protrusions of the blocks, mounting said blocks on said support portion in predetermined sequence, in at-least two circumferential rows, inserting said protrusions in the corresponding grooves, fixing a block of each row circumferentially with respect to said support portion, displacing circumferentially the remnants blocks of each row with respect to said support portion, accumulating them closely against said block already fixed, by sliding said protrusions in the corresponding circumferential grooves, regulating the total width of the resultant clearance in each circumferential row and in axial direction, between the two ends of the succession of blocks in such a way that, having considered the thermal expansion of said blocks and of said support portion at the mold operating temperature, in the mold operating between two adjacent blocks there is clearance of predetermined width, according to the rheometric characteristics of the mix and to the molding conditions such as not to cause burrs on the surface of the cured tire.

The value of such width is preferably not more than 0.08 mm.

The use of a mold manufactured in said way allows adoption of a method of curing tires characterized in that it carries out at least 2000 cycles of molding and curing said tires before the need arises for a mold end cycle cleaning.

BRIEF DESCRIPTION OF THE DRAWINGS

These and other aspects, characteristics and advantages of the present invention will be more clear by means of the following description of a preferred embodiment of the invention, in combination with the accompanying drawings, in which.

DETAILED DESCRIPTION OF THE PREFERRED EMBODIMENT

Figure 2:
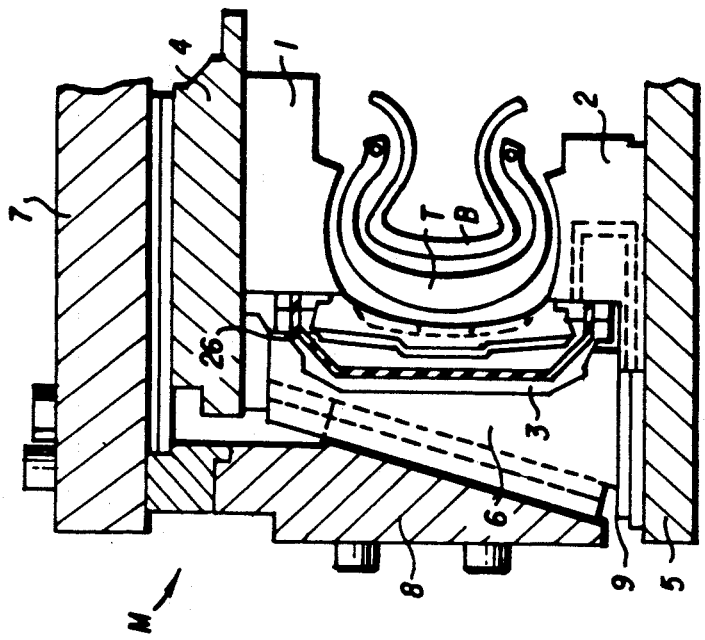
FIG. 2 illustrates a radial section in the vertical plane of the same molding and curing device as FIG. 1, the mold being in the closed condition.
Figure 1:
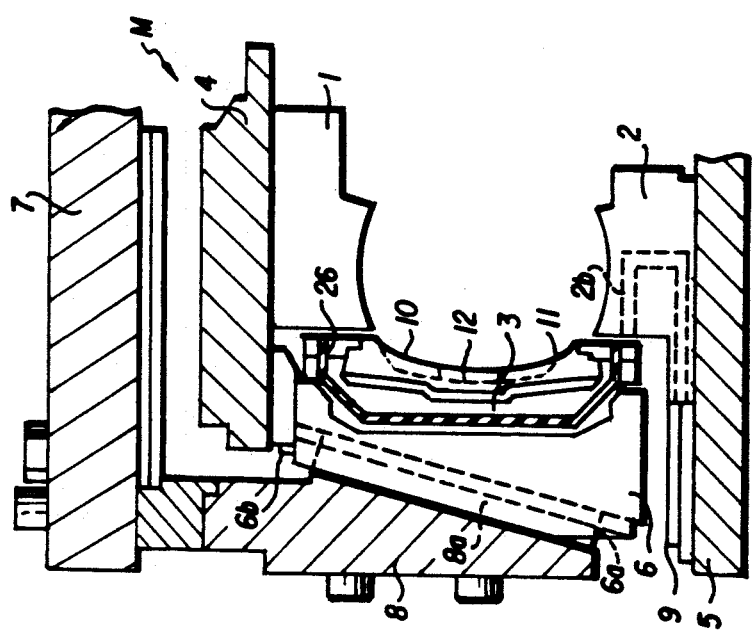
FIG. 1 shows a radial section in a vertical plane of a part of a known device for the molding and curing of a tire according to a preferred form of the present invention, the mold being in the open condition.
Figure 3:
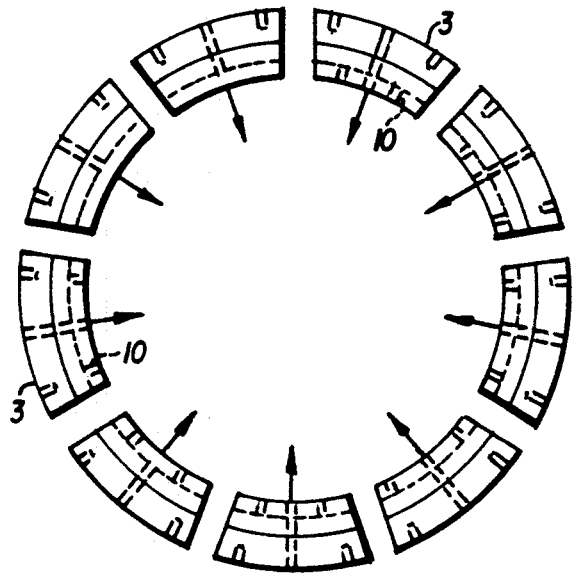
FIG. 3 is a general view in horizontal section of the ring of one centripetal mold in the open condition.

Following is the description of a preferred embodiment of the present invention, as per FIGS. 1 to 10. FIGS. 1, 2 and 3 are radial vertical section views and in horizontal section of part of a known device M, a mold of centripetal type, for the molding and the curing of a pneumatic tire such as is used in conjunction with the present invention. In these figures reference numeral 1 indicates the upper mold annular portion, numeral 2 is the mold lower annular portion, numeral 3 is a support element forming part of the ring portion of the mold, subdivided in the circumferential direction in eight or nine elements; the upper mold portion 1 has its upper surface secured to an upper plate 4 to move integrally with it in the vertical direction and the lower mold portion 2 has its lower surface secured to a lower base 5 to be maintained stationary. The supports 3, disposed in external circumferential position between the upper mold 1 and the lower mold 2, are respectively mounted on sectors 6, and these sectors 6 are mounted under the upper plate 4, so as to be both horizontally and radially shiftable. A flat disk 7 is vertically and separately mounted above the plate 4, and there is provided an external ring 8 projecting downwardly from the external circumferential portion of the lower surface of the disk 7. The internal circumferential surface of the external ring 8 is tapered to diverge downwards, and eight or nine guides 8a, each consisting of a profile having a T section, are disposed along predetermined generatrix of the internal circumferential surface, in correspondence to the respective sectors. Each sector 6 projects downwardly from the upper plate 4 in order to move both horizontally and in the radial direction by means of guides 6b consisting in a profile having a right "T" shape section, solidary with its upper surface and oriented in radial direction, housed in a corresponding obtained groove in the upper plate 4.

The external surface of any sector 6 is tapered at an angle corresponding to the angle of the internal circumferential surface of ring 8; the ring and sectors are maintained with reciprocally movable contact between them. On the external surface of each of the sectors 6 is a groove 6a corresponding to said guides 8a which is mounted for sliding movement within the groove 6a.

In the molding and curing device M, built as above described, the mold portion according to the present invention is conceived to be mounted radially inwards of the support 3. More particularly, this mold portion (FIG. 4), hereinafter designated as a "matrix", comprises small pieces with three circumferential cuts in the axial direction and a plurality of circumferentially axial long cuts: the pieces in the upper position and lower position are the shoulder blocks 10 and 11, the central pieces are the center blocks 12 and when these blocks are assembled and mounted in the support 3, on its internal surface is built a matrix having a protruding design to reproduce matrix in the tread of the pneumatic tire. FIG. 1 shows the open position of the aforementioned curing device, in which the upper mold 1 is moved upwardly with respect to the lower mold 2 and the disk 7 is also moved to an upper position, separated by the plate 4.

Since the sector 6 projects downwardly from the upper plate 4 in such a way that it can also move in the horizontal direction, it is in its lifted position with the plate 4 and furthermore the sector 6 is pushed toward the axis of the mold when it is moved by the external ring 8 which projects downwardly from the flat 7 disposed above the plate 4 and separated from it. Consequently even the support 3, which is fixed to the sector 6, is disposed in its lifted position, still centered around the axis of the mold.

At the beginning a raw carcass T and the curing bladder B are inserted in the toroidal space defined by the upper mold 1, the lower mold 2 and the supports 3, and when the upper plate 4 is lowered by means of a pressurized fluid cylinder (not illustrated), the sector 6, that descends along with the plate 4, slides gradually and moves in the radial direction toward the axis of the mold while descending, to cause a connection between the groove 6a and the guides 8a of the external ring 8. When the lower surface of the sector 6 arrives in abutment against the slippage plate 9 which is secured on the base 5, the upper mold, stops in an established position, and the support 3 reaches the illustrated open condition in FIG. 3. Successively, when the disk 7 is lowered, the external ring 8 slides along the external surface of the corresponding blocks 6 and pushes the respective blocks 6 radially inwardly toward the axis of the mold, so that the supports 3 that are fixed with the respective blocks 6, are simultaneously pushed toward the axis to form a closed ring. In this way the closed condition shown in FIG. 2 is accomplished, and the matrix is delimited for the molding of the external surface of the tire, by means of the blocks 10, 11 and 12 on the internal surface of the supports 3, the upper mold 1 in upper position and the lower mold 2 in lower position. The raw carcass T is pressed against the mold by the generated pressure in the bladder B which is supplied with a fluid (e.g. steam) under high pressure and temperature, and it is so molded and cured. It is to be noted that to bring the mold from the closed condition to the open condition the foregoing steps are performed in reverse sequence.

Figure 4:
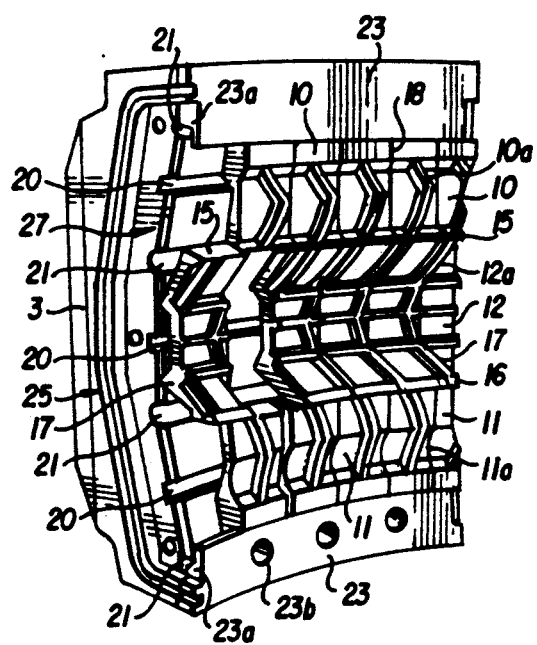
FIG. 4 is the perspective view of a mold sector of the present invention.

Now will follow the description of the shoulder blocks 10 and 11 and of the center blocks 12 that form the relief design of the tire as well as the montage of these blocks on the support 3. FIG. 4 is a perspective view showing the condition in which the shoulder blocks 10 and 11 and the center blocks 12 have been mounted in a support 3, with some blocks removed to the purpose of greater clarity. The shoulder blocks 10 and 11 and the center blocks 12 are metallic blocks cutting the disposed matrix on the internal surface of the support 3 in three portions across the axial width thereof and in a plurality of portions around the circumference thereof; in FIG. 4 a center block 12 and a shoulder block 11 are illustrated and spaced by the pack of the other blocks.

Preferably the tread matrix pattern is formed by at least in three circumferential block rows, each comprising at least 50 blocks: the number of the rows is conveniently chosen according to the width of the tire, and so of the mold, and to the design type desired for that particular tread. The design influences the selection of the number of blocks in each circumferential row, that number can even be different row to row. The separation surfaces 15 and 16 between the center blocks 12 and those of shoulder 10 and 11 are tilted toward the center of the mold and toward each other; the separation surfaces 17 between similar blocks 12 are positioned on the surface curves of the matrix in positions between the cross ribs 12a. In the same manner, the separation surfaces 18 between the shoulder blocks are preferably positioned on the curved surface of the matrix, in positions that do not interfere with the cross ribs 10a and 11a respectively.

In this way, in the relief design when the shoulder blocks and those of center have been assembled, in a great quantity of the surrounded con cavity by the ribs 10a, 11a and 12a there will exist always a separation surface 17 or a separation surface 18. We shall observe that the separation surfaces 15 and 16, that divide the matrix in the axial direction, cut in two the disposed annular ribs in the circumferential direction; moreover these ribs have generally a considerable thickness, so that even if they are cut to the center of the thickness, the mechanical resistance of the two separated portions is still satisfactory.

However, in the case that these ribs do not have sufficient thickness it still suffices to dispose the separation surfaces in positions adjacent these ribs and so all the separation surfaces can be disposed in optimal positions for forming the ribs net of the matrix. In this case in the surrounded concavity from the ribs is present at least one between the separation surfaces in the axial direction or in the circumferential direction. In order to prevent the bubbles formation it is however preferable that in any concavity there are separation surfaces in both the axial and circumferential directions. For the motives that will appear more clearly in following it is convenient that the cutting lines that generate the blocks are rectilinear, however such condition is not an obligation and one can have cases, for designs tread which are particularly complex in which it is preferable to have cutting lines having a broken or a curved shape as illustrated by example in FIGS. from 8(a) to 8(c).

According to a preferred embodiment the above blocks are precision cast in aluminum, utilizing the die-casting technique and preferably include steel foils to form on the tread of the tire the well known lamels of the design. However, one could use other materials and other technologies, as for example blocks of steel with numeric control machine process worked surfaces and with design obtained by electroerosion, or blocks in other cheaper materials (e.g. plastic materials) for molding and curing tire prototypes; these would be very short life matrixes. Conveniently the above blocks can be coated with particular materials, for example metallic materials or with adapted coatings, specifically suitable, such as titanium, to facilitate the slippage of the elastomeric material thus avoiding the attachment of the aforementioned material to the surface of the mold.

The support 3 on which are mounted the shoulder blocks 10 and 11 and the center blocks 12 have three grooves 20 formed on its internal surface, oriented in the circumferential direction: a protrusion 12b disposed on the rear surface of the block 12 is movably housed in the central groove 20 with the existence of a small clearance and protrusions 10b and 11b, disposed on the rear surface of the blocks and respectively, are movably housed in the upper and lower grooves 20, with a small clearance between them. These protrusions can have any convenient form, e.g. cylindric or prismatic, and in such case they preferably extend in the circumferential direction. Consequently, when all the metallic blocks lo, 11 and 12 have been mounted on the support 3 each block can move both in the axial direction and in the circumferential direction.

Further, on the internal surface of the support 3 vent holes 21 are formed for the passage of air, with a horizontal path, corresponding to the aforementioned separation surfaces 15 and 16 and to the separation surfaces between the blocks 10 and 11 and the upper and lower borders of the support 3; furthermore, for any sector, three vertical vent holes 22 are formed for the passage of air, that intersect at a right angle with vent holes 21, and in their ensemble the vent holes for the passage of the air form a net. It is to be noted that also the grooves 20 serve as vent holes for the passage of air.

On the internal circumferential surfaces of the upper and parts of the support 3 there is applied retention plates 23, secured by screw means, and the borders of the shoulder blocks 10 and 11 are shaped in order to couple with flanges 23a of the retention plates 23, that extend toward each other.

In the lower retention plate 23, three air passage holes 23b are formed, in communication with the vertical vent holes 22 of the support 3. As regards the reciprocal coupling surfaces of the supports 3, on one of these a groove 2B is formed, and in a position radially internal with respect to the groove 25, on both the surfaces seats 27 are formed a blockage tip 28, (FIG. 7) secured by screws means.

In the groove 25 a seal 26 is disposed. Consequently, when the shoulder blocks 10 and 11 and the center blocks 12 are mounted on the support 3 the upper and lower retention plates 23 and are secured on the support 3, a tip 28 is secured on one of the coupling surfaces, and the blocks 10, 11 and 12 are mounted sequentially by the other coupling surface, on the support 3, as they are slideable with respect with it. The work can be easily carried out for the fact that the blocks are mounted sequentially, guided by the protrusions existing on their rear surface, that are inserted inside the grooves 20. Furthermore, as the separation surfaces brought in reciprocal contact are tilted toward the inside of the mold and the upper and lower borders of the shoulder blocks 10 and 11 are coupled with the retention plates 23, both the center blocks and those of shoulder cannot be detached from the support 3.

When all the blocks 10, 11 and 12 have been mounted on the support 3 in the above indicated way, another tip 28 is secured in the seat 27 provided on the opposite coupling surface, and the matrix portion with the relief design corresponding to the tread design is complete.

On the overleaf of the matrix so completed there results a vent hole net for the air and they communicate with the holes 23b provided in the lower part of retention plate 23. In the embodiment shown, the support 3 is made of steel while the blocks are of aluminium, prepared as before indicated, and present surfaces with calculated entity roughness and are designed in order that, at room temperature, when the respective blocks have been mounted in the support 3 and accumulated one close to the other against the blockage tip 28, a predetermined clearance width L1 (FIG. 7) is defined in the circumferential direction and a predetermined clearance width L2 (FIG. 5) is defined in the axial direction.

Figure 7:
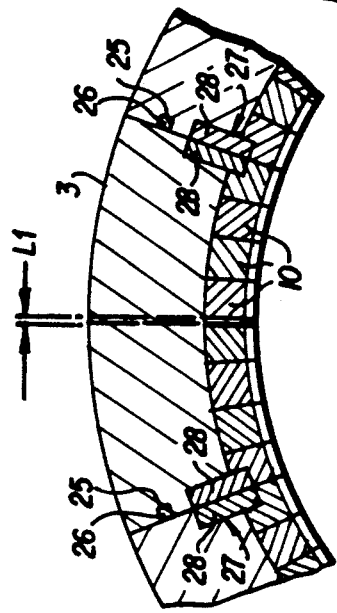
FIG. 7 is a partial view of the transverse section, in a plane, of the assembled sectors.
Figure 5:
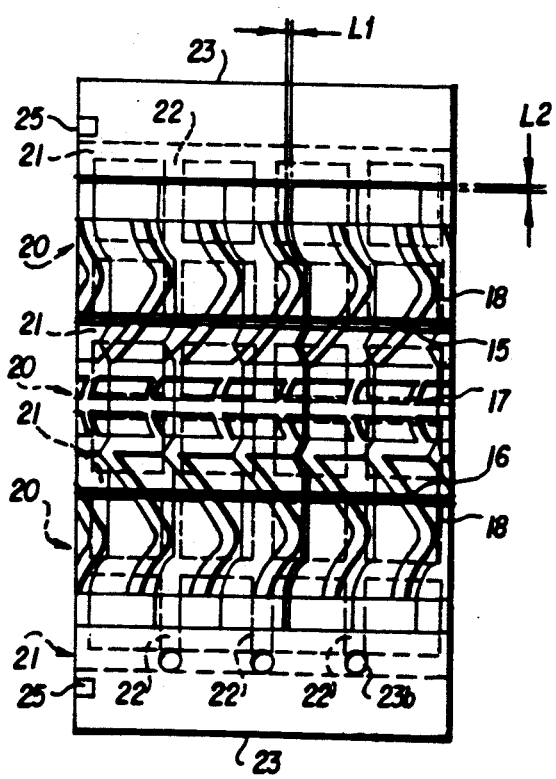
FIG. 5 is a frontal view in the radial direction of the same sector.
Figure 6:
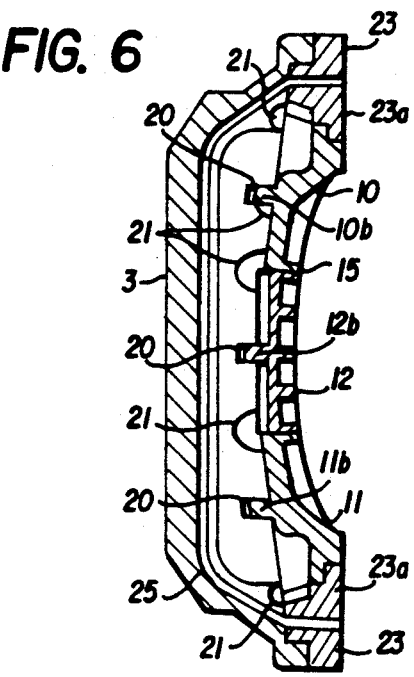
FIG. 6 is a radial vertical section of the mold.

More precisely, as shown in FIGS. 5 and 7, the clearance L1 is the resulting residue space after having accumulated the respective blocks with one end of the support in the circumferential direction while the residue space above the blocks shoulder row 10, when the blocks 10, 11 and 12 have fallen downwards due to the effect of gravity, forms clearance L2. By means of the selection of the total values L1 and L2 of these clearances, calculated to take into consideration the thermal expansion difference between the support and the blocks, when the mold is brought in curing temperature, the clearances between the respective blocks can be maintained to the established value.

In fact, during molding and curing, while the temperature of the mold increases, the spaces L1 and L2 decrease in width due to the difference in the thermal expansion between the aluminium blocks 10, 11 and 12, and the steel support 3, and to the final curing temperature (about 160° C.) the reduced width of the clearances will be uniformly distributed between the blocks and the width $\epsilon$ of the clearance between blocks adjacent will be preferably reduced from the maximum value to 0.08 mm.

Applicants have experimentally verified that if the clearance $\epsilon$ is equal or lower than 0.08 mm the air can pass through the clearance while the rubber generally is not allowed to pass said clearance. More precisely, the possibility for the rubber to penetrate the clearance depends upon its composition and upon its rheometric characteristics, in particular by its viscosity, to the beginning of the process of curing, so that, fixed a clearance value, a molding pressure, and a curing temperature of the tire, in these conditions certain rubbers do not manage to penetrate the clearance, while others penetrate, causing burrs. A value of the clearance of 0.08 mm is critical because for higher values the greater part of the rubbers (at the usual temperature and curing pressure conditions) penetrate the clearances causing burrs; but there is no critical lower value for which no rubber can penetrate the clearance (unless one chooses values such as to prevent even the outflow of air) because for any clearance value, even for values equal or lower than 0.02 mm, with determined rubbers there is the possibility of infiltrations and so of burrs.

In other words, for each elastomeric material, in particular for the rubbers of the tread, there is a particular value of the clearance that prevents burrs formation. For example the applicant makes reference to three families of elastomeric compositions, hereinafter respectively identified as A; B; C; largely experimented before their definitive utilization in the tread band of tires with different characteristics and performances, which performance at molding, decidedly differentiated, were found to depend on their viscosity (Mooney) at the initial curing temperature, substantially equal to 160° C., with the molding pressure, substantially equal at 28 atmospheres, and on the quantity of lamp-black and plasticizer present in their composition, expressed as parts in weight for 100 parts in weigh of elastomeric material.

The three families of mix are identified as follows:

| MIX | VISCOSITY | BLACK | PLASTICIZER |
| --- | --- | --- | --- |
| A | 90 | 85 | 43 |
| B | 70 | >90 | >50 |
| C | 90 | 79 | 35 |

The aforementioned mix have evidenced the illustrated performance in the following table:

| | PERFORMANCE | |
| --- | --- | --- |
| | Clearance | |
| | Optimum | Unacceptable |
| 0.08 mm | A | B |
| 0.05 mm | A B | C |
| 0.02 mm | A C | |

We shall clarify that for "Optimum" performance we intend burrs absence on the cured tires and, in this ambit, the possibility to carry out cycles of at least 2000 moldings before it becomes necessary the end cycle cleaning (chemical and/or mechanical, i.e. with solvents or with abrasive materials) of the assembled mold. For "unacceptable" performance we intend instead burrs presence on the molded tires, in particular as consequence of a performance of the mixes such as to cause the impossibility, for occlusion of the clearances, to carry out more than 500 moldings before being obliged to provide to the aforementioned cleaning cycle of the mold; besides, often after the first cleaning of the mold there is no possibility to reach the number of moldings obtained during the first utilization cycle (with new a mold).

As it can be noted, the mix A presents an optimum performance with any clearance value, even if it has demonstrated that the width of 0.08 mm is a value limit, not to be exceeded to avoid burr formation. The mix B and C present instead a performance substantially dependent on the value of the adopted clearance.

The mold according to the invention and the corresponding construction method, have thus also solved this problem. Varying in fact the width of the above clearances L1 and L2 it is possible to vary the final value of the clearance choice for any rubber type to a value more opportune: the shift operation of the clearance results in simple and fast execution because is sufficient to change one or more of the tips 28 and one of the retention plates 23 with others of different thickness, to obtain with the same mold and with the same blocks a different value of the clearances L1 and L2.

Figure 8A:
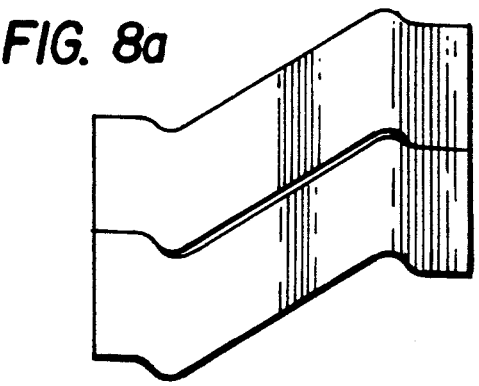
FIGS. 8(a), 8(b) and 8(c) show schematically three different blocks arrangements in reciprocal contact with not complementary adjacent surfaces.
Figure 8B:
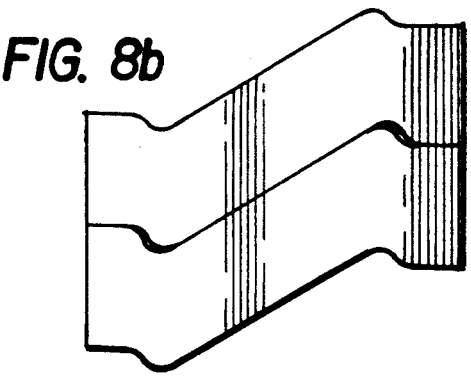
Figure 8C:
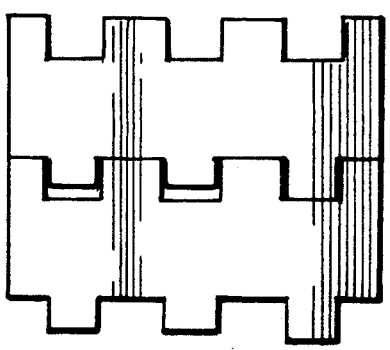

Another way to obtain a width predetermined clearance is illustrate in FIGS. 8 (a,b,c) that comprises forming the surfaces of the adjacent blocks according to cutting lines which are not complementary for a certain part of their total length, the distance between the two blocks in the aforementioned part being exactly the required clearance. Preferably the length of the part having the clearance decreases with the increasing of the width of the clearance and in particular does not exceed 30% of the aforementioned total length for width clearances of the order of 0.08 mm. If in fact the zone with clearance of 0.08 mm should occupy 30% or more of the entire length of the cutting line between two adjacent blocks, then this aspect of the finished tire will be substandard.

Figure 14A:
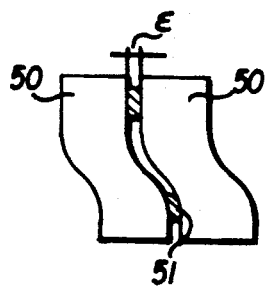
FIGS. 14(a) and 14(b) are respectively schematic views illustrating (a) two metallic blocks placed in reciprocal contact and (b) the contact surface of one of the two blocks, according to a further preferred form of the present invention.
Figure 14B:
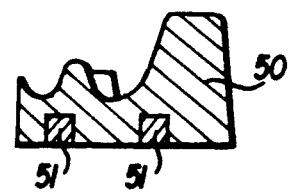

Further another method to obtain a width established clearance and to assemble the blocks without controlling the already cited end clearances L1 and L2 or similar, is to insert a thin spacer 51 (FIG. 14) or to form an equivalent protrusion thickness on the opposite surfaces of each block 50, as shown in the FIGS. 14a and 14b; according to these methods, the provided clearance $\epsilon$ is steadily maintained, fixed independently of the material type of the blocks and of the mold 3. In addition it is further possible to use simultaneously a matrix assembled portion made with the last described method and an assembly of the previously described methods.

Figure 10:
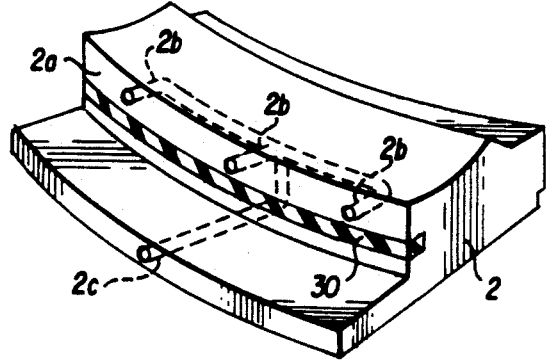
FIG. 10 is a perspective view of the lower flank of the mold.

According to a further aspect of the present invention, means are provided to aspire the air, that thus can be perfectly extracted from the mold. Such means comprises a connection between the present vent holes net on the surface of the matrix directed toward the blocks and the aspiration device, easily realizable, for example, through a hole 100 and the relative pipe 105 (FIG. 9) for the connection of each matrix, through the corresponding sector, with an aspiration device 40. In a different particular embodiment, as shown in FIG. 10, on the coupling surface 2a of the lower mold 2 of the mold with the retention plate 23 are made with openings 2b for vents of air in the positions corresponding to the vent holes 23b on the retention plate 23 and these vents 2b are conveyed in an unique vent hole, bent to be brought to one discharge 2c. To this discharge 2c is connected a conduit 41 of an aspiration device 40 (see FIG. 9).

In the coupling surfaces 1a and 2a of the upper mold 1 and lower mold 2 of the assembly mold with the retention plates 23 are housed seals 30 and so in assembling of the parts 1, 2 and 3 the vent holes 21 and 22 for the air on the overleaf of the blocks 10, 11 and 12 form one closed space with the help of the aforementioned seals 30 and the already mentioned seals 26 and the closed space communicates with the aspiration device 40 through the vent holes 23b and 2b and the conduit 41. During molding and curing this aspiration device is activated and air can be forcedly extracted through the clearances between the adjacent blocks 10, 11 and 12 with a modest partial vacuum (about 300 mmHg or less) so the hollows of air are totally eliminated and bubbles formation is prevented. In addition, in the illustrated embodiment, a twoway valve is provided, so that the conduit 41 and a pressurized air tank 44 may be connected to the free end of a conduit 43 between the valve 42 and the tank 44.

Consequently, when opening the valve 42 the conduits for the air are also opened, so that one can selectively use the aspiration device 40 or the tank 44 of compressed air when the valve 42 is connected with the tank of compressed air and this is activated, through the conduits 43 and 41, the holes 2b and 23b and the vent holes 21 and 22 air under pressure is blown out from the clearances, between the adjacent blocks 10, 11 and 12. By periodically executing this operation the accumulated gummy material infiltrations between the blocks can be removed thus improving the aspiration effect of the air.

In the aforementioned embodiment, after the curing device M was used for 30 days, investigations were carried out to ascertain bubbles existence but they were not detected.

As above described, in the illustrated embodiment, as the matrix is cut both in the circumferential direction and in the axial direction, the liberty of selection of the cutting positions is so wide that even in complicated reliefs designs separation surfaces can be obtained between the blocks and this effectively prevents bubbles formation. In addition, there is no longer mechanical resistance diminution of the ribs on the matrix, due to inopportune separation surfaces.

Figure 11:
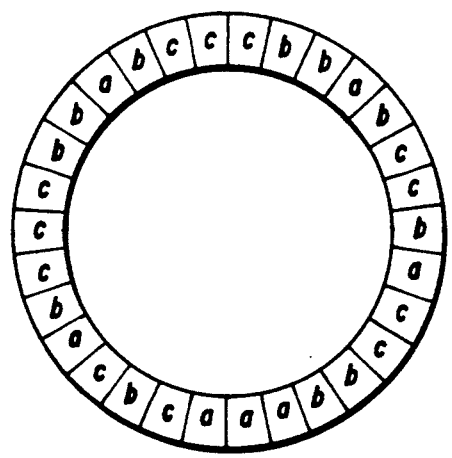
FIG. 11 shows schematically the sequence pitches of a metallic matrix for pneumatic molding.

Furthermore, as shown schematically in FIG. 11, a matrix for tires normally comprises the combination of a certain number of elementary design portions (pitches or pitch fractions) of different circumferential development to avoid noise being generated as the tread contacts the road surface, and when the matrix is subdivided in blocks, as in the case of the present invention, each corresponding with one of said pitches or fractions, it becomes extremely easy to change the sequence of succession of the blocks and so a pitch variation according to what is necessity can be introduced very easily, without requiring the construction of a new mold.

Figure 12A:
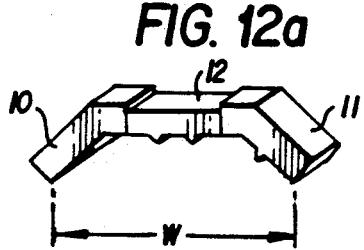
FIGS. 12(a) and 12(b) are perspective partial views of the matrix of one mold that illustrate the width shift in axial direction.
Figure 12B:
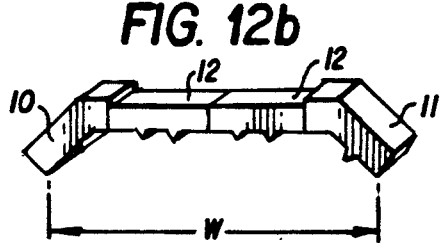
Figure 9:
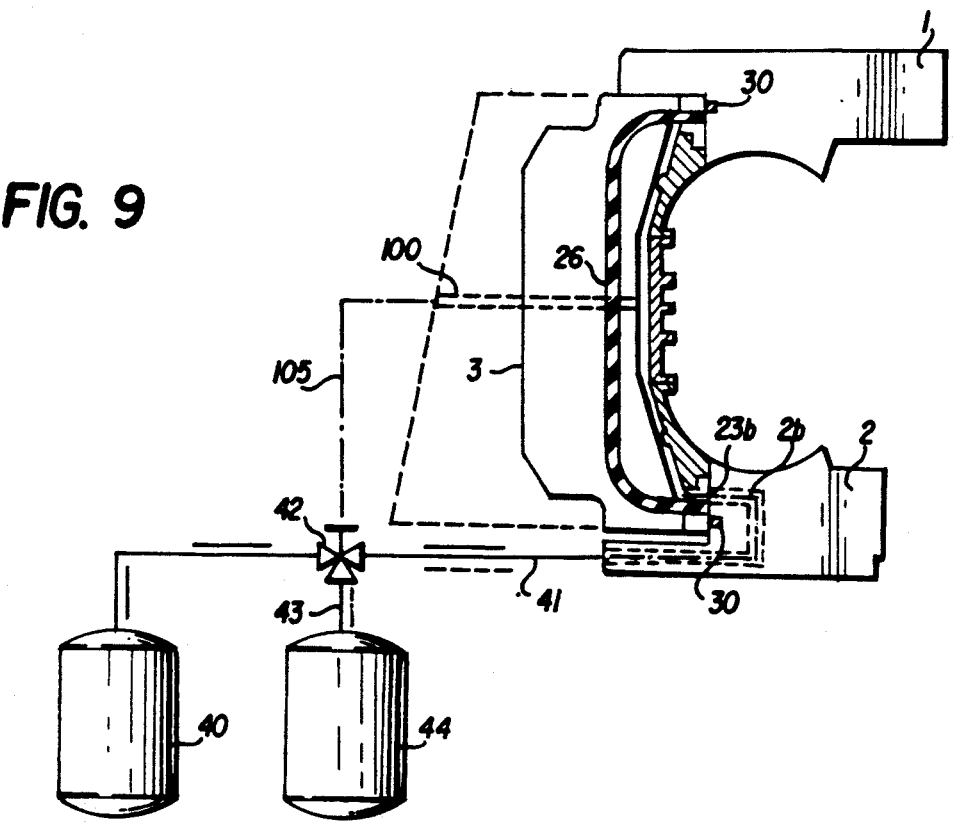
FIG. 9 illustrates schematically the air evacuation circuit.

It is further easy, as shown in FIG. 12, to change the width "w" of the tire, within certain limits. More particularly, a new matrix in which there is combined together two center blocks 12, axially flanked, and shoulder blocks 10 and 11 by the opposite parts of the center blocks, can be easily built simply by modifying a provided matrix of a sole center block 12, besides the shoulder blocks 10 and 11, by means of an insertion of a second center block row 12.

Figures 13A, 13B:
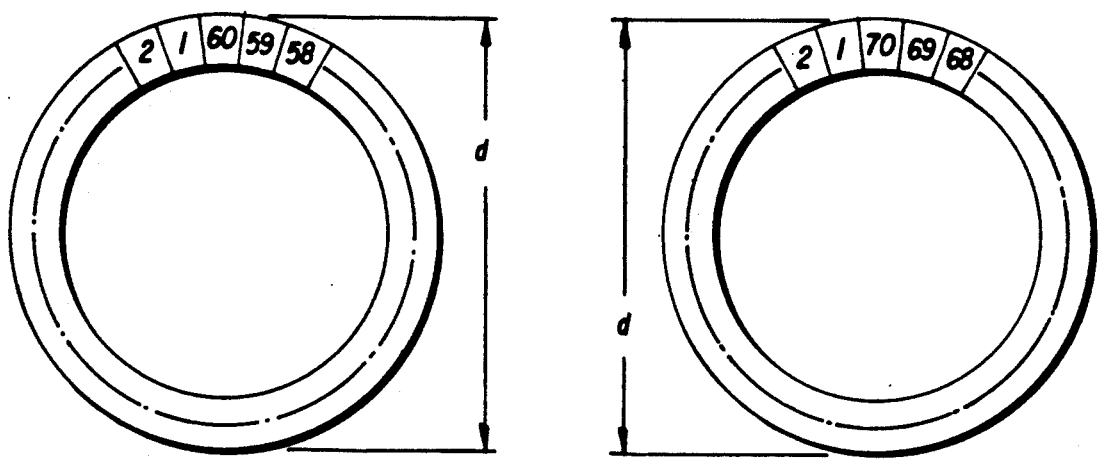
FIGS. 13(a) and 13(b) are schematic views of the aforementioned matrix showing a change in the diameter.

Further, as shown in FIG. 13, modifying one mold in which for example 60 blocks are combined in the circumferential direction another mold can be built in which 10 blocks are added so that 70 blocks are now combined together in order to change the external diameter "d" of the tire. In this way the construction of the matrix according to the present invention is easily applied to tires having different widths w and different diameters d, with the consequent advantages. If the external diameter d is changed as shown in FIG. 13, then strictly speaking, the matrix assumes a polygonal form because the curvature is different in the two cases, but as the circumferential size of the blocks is small, in practice we have no problems.

While the curing mold M, according to the forms described, is of centripetal type with the subdivided ring in eight or nine assembled pieces in circumferential direction, the present invention is equally applicable to curing shell molds in which the mold is divided in two half portions according to a mid-circumferential equatorial plane.

Figure 15:
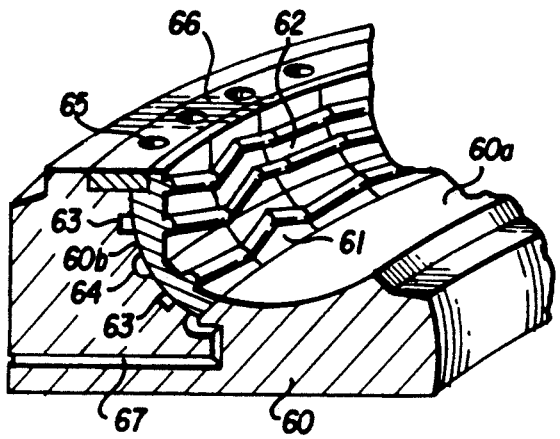
FIG. 15 is a perspective view that shows part of the lower portion of one metallic shell mold (in two half portions) according to another preferred embodiment.

FIG. 15 is a view in prospective, partially in radial section, of one of the two half portions of the mold, namely of the lower portion 60 of one shell mold. Such lower portion 60 has an annular form, with the relative excavated upper surface to form a flank portion 60a and a central portion 60b, and in the central portion 60b are inserted shoulder blocks 61 and center blocks 62. Such combined blocks between them, form a matrix to mold a relief design on the tread band of a tire. The matrix is cut in the circumferential direction to form a shoulder portion and a center portion. The center portions and a shoulder portion are cut in the axial direction into a small plurality of pieces, in order to form shoulder blocks 61 and center blocks 62.

On the surface of the central portion of the shell 60b are alternately two grooves of guides 63 and two vent holes for the air 64, both extending in circumferential direction, the grooves of guides 63 being shaped in forms such to slideably hold protrusions on the rear surfaces of the shoulder blocks 61 and on center blocks 62. The vent holes 64 for the air are directed in horizontal direction at positions corresponding to the separation surfaces between the shoulder blocks 61 and those of center blocks 62 and of the separation surfaces between the shoulder blocks 61 and the lower portion of the mold 60 respectively; furthermore corresponding to the separation surfaces in the axial direction, between adjacent blocks of shoulder and adjacent center blocks there is a plurality of vertical vent holes 65. After the shoulder blocks 61 and those of center block 62 have been mounted in the central portion of mold 60b a retention ring 66 is secured to the lower portion of the mold 60, so as to press the center blocks 62 downward. An upper shell not illustrated is built in similar way but symmetrically to the lower shell 60 so that assembling together the lower shells and upper shell forms one complete mold. It is known that air vent holes 64 and 65 respectively in the horizontal direction and vertical directions on the rear of the shoulder blocks 61 and center block 62 form a closed circuit, for which a hole 67 for the passage of air is formed in the body of the lower shell 60, corresponding to the lower end of the closed circuit, and is connected in communication with an aspiration device or with a pressure tank through a two way valve, similarly to the previously described embodiment.

In the two half portions of the curing mold, in which the metallic matrix is divided into two parts, upper and lower, as before described, utilizing shoulder blocks 61 and center blocks 62, cut not only in the axial direction but also in the circumferential direction, appropriate separation surfaces can be obtained which correspond to many of the tread design variations, thus forming rigid blocks. By adjusting the clearances between the adjacent blocks to a size of 0.08 mm or less, the extraction of air can be accomplished and so avoiding bubbles generation, and in addition the rubber is prevented from penetrating the clearances, preventing burrs formation, as already described.

Furthermore, making use of aspiration means and of air under pressure, it is possible to improve the extraction of the air and to prevent totally burrs formation. Clearly in this mold the construction of the matrix for circumferential slippage of the blocks can present some difficulty: in such case the drawback is overcome inserting the blocks in the mold, from the top to the bottom, that is from the ring zone toward the flank, for axial columns circumferentially flanked. It is evident that nothing is changed as regards the regulation of the clearances L1 and L2.

It should now be understood how the invention can be generally applied to any curing mold for hollow products in elastomeric material or plastomeric material which include two sidewall portions axially opposite and a central annular portion, interposed : conveniently in such mold at least the aforementioned annular portion can be composed of a plurality of blocks disposed axially flanked in at least two circumferential rows, said blocks being reciprocally separated between them, and from the body of said portion both in circumferential direction and in axial sense, from a clearance of established width, preferably of a value not more than 0.08 mm, measured at the operating temperature of said mold.

Figure 16:
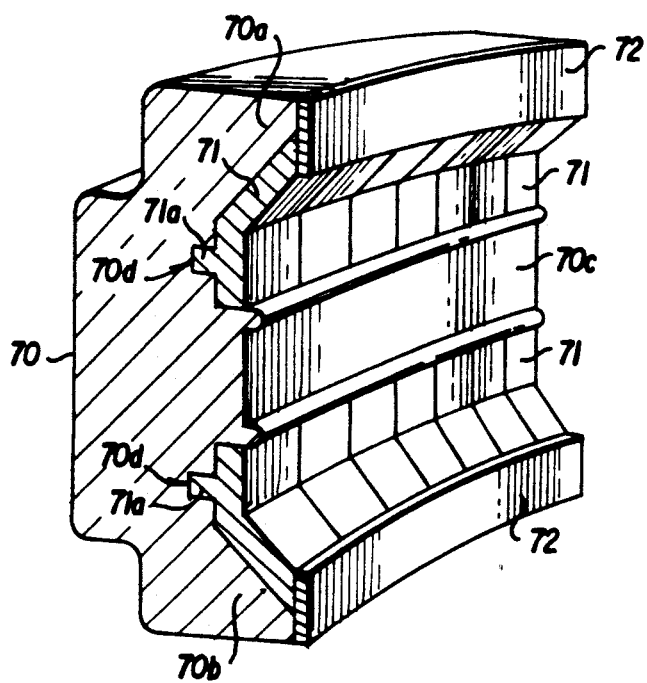
FIG. 16 is a perspective view of a radial sector portion of a mold according to the more general embodiment of the present invention.

FIG. 16 shows a preferred embodiment of this mold; in this figure it is shown a section 70 of the annular portion of the mold. In this section 70 the upper borders 70a and the lower borders 70b extend toward the internal side and also the central portion 70c having a surface corresponding to the ring surface of the parallel disposed tire to the above borders, extends toward the internal side.

Shoulder blocks 71 are shaped to be mounted in the space between the upper border 70a and the central portion 70c and between the central portion 70c and the lower border 70b, and blocked by the retention plates 72. On the reverse side of the shoulder blocks 71 are disposed protrusions 71a and as the protrusions 71a are slideably mounted in guides 70d formed in the support surface 70 the blocks 71 can be mounted on the support 70 making them slide in circumferential direction. Similarly to the forms previously described, the regulation of the clearances between the adjacent blocks is simple and bubbles and burrs production is easily avoided.

Different and important are the advantages obtained with the mold according to the present invention. In first place, as the matrix is subdivided in a blocks plurality, it is possible to choose adequately the positions of the separation surfaces so as to correspond to the many varieties of different treads, and it is possible to build a long life rigid metallic mold, and also the extraction of the air is facilitated. Furthermore, for the fact that the clearances between the blocks can be adequately maintained open, bubbles formation is avoided during the curing, due to the trapped air, and similarly the penetration of rubber in the clearances is avoided and so the burr formation. Subdividing the matrix not only in the axial direction but also in the circumferential direction, the sequence pitches can be easily changed. Besides, as the addition or the elimination of blocks can be simply executed, it is easy to change the dimension of the mold both in the axial direction and in the circumferential direction. Upon the necessity of such sequence shifts and/or change of dimensions, is not necessary to build a new mold, with consequent economy, Furthermore, making use of aspiration means, the air remaining trapped, during the curing and the molding, can be forcedly extracted and so prevent bubble generation. Further, utilizing the air pressure means the elastomer material which eventually penetrates in the clearances between the adjacent blocks can be removed easily and so the vent holes through which the air is extracted are always clean and so bubbles generation can be prevented. Since the principle of the present invention has been described in connection with a preferred embodiment, it is intended that all the description and figures in the accompanying drawings shall be interpreted as elucidatory and not limitative of the purposes of the invention.

We claim:

1. A mold of the centripetal type for curing raw tire carcasses for vehicles, comprising
    two axially opposite sidewall portions, substantially corresponding to the sidewalls of said tire, axially and reciprocally displaceable with respect to each other,
    a central annular portion, interposed between said sidewall portions, substantially corresponding to the tread portion of said tire, said annular portion having a plurality of sectors circumferentially disposed around the axis of said mold and provided with air evacuation holes,
    said sections being mounted to be radially displaceable toward and away from said axis, said sections carrying on their radially inner surfaces a plurality of blocks forming are relief rib matrix for molding a corresponding tread design disposed in at least two flanked circumferential rows with each of said blocks being separated from adjacent blocks substantially along its entire contour by clearances acting as venting gaps connected to said air evacuation holes in the secondary body, the width of said clearances being determined by the rheometric characteristics of the mixed raw material and by the molding conditions, in such a way that at the curing temperature the clearance is wide enough to permit air trapped within the mold to escape, but to prevent elastomeric material from being extruded therethrough so as to avoid burrs on the surface of the cured tire said blocks being further separated from the sector that contains them by clearances also acting as venting gaps and connected to said air evacuation holes in the sector body.

2. A mold according to claim 1 in which said clearance width permits at least 2000 molding cycle actions before the need for a cleaning cycle of the mold.

3. A mold according to claim 1 in which the value of said clearance width is not more than 0.08 mm, measured at the operating temperature of said mold.

4. A mold according to claim 1 in which said blocks are disposed in at least 3 circumferential rows.

5. A mold according to claim 1 in which there are at least 50 said blocks for each circumferential row.

6. A mold according to claim 1 in which said blocks are defined by cuts in the matrix with cutting lines oriented along the axial and circumferential directions.

7. A mold according to claim 6 in which between two successive ribs on said matrix there is at least a separation surface between said blocks.

8. A mold according to claim 7 in which said separation surfaces, on two adjacent blocks, follow cutting lines which are not complementary for a limited portion of their length.

9. A mold according to claim 1 in which said blocks are of aluminium, made by precision diecasting.

10. A mold according to claim 1 in which said blocks are of steel, made by electroerosion (EDM) with the reciprocal contact surfaces formed by numerical control machines and processes.

11. A mold according to claim 1 in which blocks are positioned on the surface toward the support sector, by means of a housed protrusion mounted in a circumferential groove in the body of said sector, said mounting being such that said blocks are circumferentially displaceable with respect to said sector.

12. A mold according to claim 11 in which between said protrusions and the corresponding groove that contains them, there are clearances to permit a displacement in the axial sense of the block with respect to the support sector.

13. A mold according to claim 1 in which said vent holes are connected to fluid aspiration means.

14. A mold according to claim 13 including means for connecting said vent holes alternatively to fluid pressure means.

15. A mold according to claim 1 in which said blocks have protrusions of established thickness, said protrusion being formed on at least one of the reciprocal contact surfaces with the other blocks.

16. A mold according to claim 1 in which each block corresponds to one pitch or a pitch fraction of the corresponding design tread.

17. A curing shell mold for curing raw tire carcasses, comprising two symmetrical axially opposite and axially reciprocally displaceable mold parts, each mold part being substantially concave on opposing surfaces, the concave surface of each part presenting a central radially inner portion substantially corresponding with one sidewall of the tire, and an annular radially outer portion substantially corresponding to a half portion of the tread of said tire, said annular radially outer portion being provided with air evacuation holes, said annular portion of each mold part comprising a plurality of blocks forming a relief rib matrix for molding a corresponding of the tread disposed in at least two flanked circumferential rows, with each of said blocks being separated from adjacent blocks substantially along its entire contour by clearances acting as venting gaps connected to said air evacuation holes in said annular radially outer portion, the width of said clearances being determined by the rheometric characteristics of the mixed raw material and by the molding conditions, in such a way that, at the curing temperature, the clearance is wide enough to permit air trapped within the mold to escape, but to prevent elastomeric material from being extruded therethrough, so as to avoid burrs on the surface of the cured tire.

18. A mold of the centripetal type for curing raw tire carcasses for vehicles, comprising two axially opposite sidewall portions, substantially corresponding to the sidewall of said tire, axially and reciprocally displaceable with respect to each other, a central annular portion, interposed between said sidewall portions, substantially corresponding to the tread portion of said tire, said annular portion having a plurality of sectors circumferentially disposed around the axis of said mold, said sectors being mounted to be radially displaceable toward and away from said axis, said sectors having on their radially inner surfaces a relief rib matrix for molding of a corresponding tread design, said molding matrix comprising a plurality of blocks disposed in at least two flanked circumferential rows and separated, from each other and from the sector that contains them, by spacers for establishing clearances of prefixed width, said width being determined by the rheometric characteristics of the mixed raw material and by the molding conditions, in such a way that at the curing temperature the clearance is wide enough to permit air trapped within the mold to escape, but to prevent escape of elastomeric material so as to avoid burrs on the surface of the cured tire.

* * * * *